MOUNTING

Filed Dec. 14, 1949

5 Sheets-Sheet 1

Inventor

Gustav H Kaemmerling

By Ralph Hammar

Attorney

April 13, 1954 G. H. KAEMMERLING 2,675,202

MOUNTING

Filed Dec. 14, 1949 5 Sheets-Sheet 2

Inventor

By Gustav H Kaemmerling

Ralph Hammar

Attorney

Inventor
Gustav H Kaemmerling
By Ralph Hammar
Attorney

Inventor
Gustav H. Kaemmerling
By Ralph Hammar
Attorney

Inventor
Gustav H Kaemmerling
By Ralph Hammar
Attorney

Patented Apr. 13, 1954

2,675,202

UNITED STATES PATENT OFFICE 2,675,202

MOUNTING

Gustav H. Kaemmerling, Erie, Pa., assignor to Lord Manufacturing Company, Erie, Pa., a corporation of Pennsylvania Application December 14, 1949, Serial No. 132,956

14 Claims. (Cl. 248—358)

This invention is a continuation in part of application Serial No. 59,331, filed November 10, 1948, now abandoned, and is intended to simplify the manufacture of rubber mountings by having the supporting and supported members connected prior to and during molding by knock-out sections. At the end of the molding operation, the knock-out sections are severed leaving the supporting and supported members free for the necessary relative movement. The load carrying capacity of the mounting is increased by having sections on either or both the supporting and supported members extending transverse to the knock-out section. Further objects and advantages appear in the specification and claims.

Figure 1:
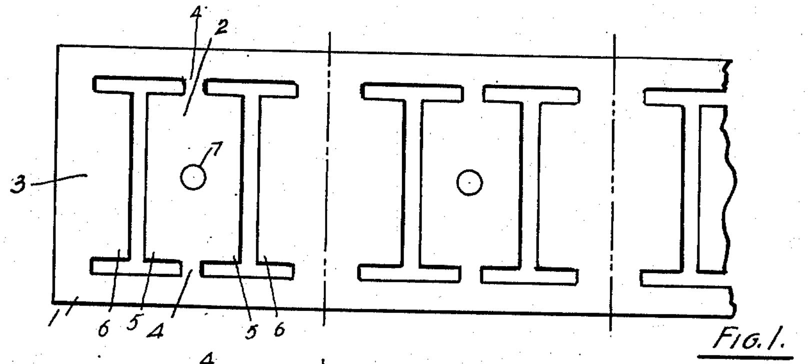
Figure 2:
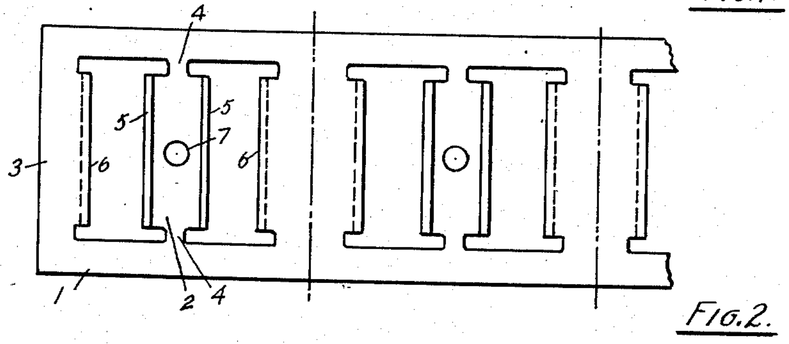
Figure 3:
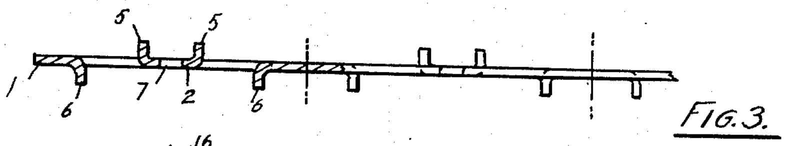
Figure 4:
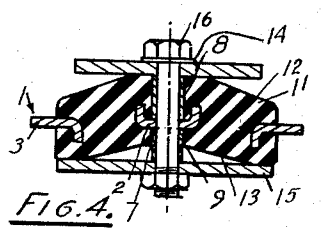
Figure 6:
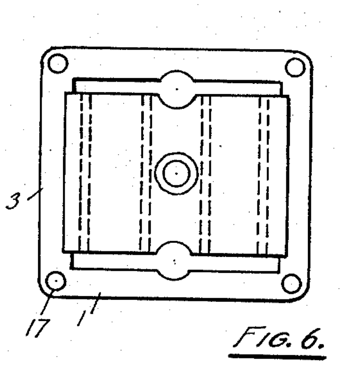
Figure 5:
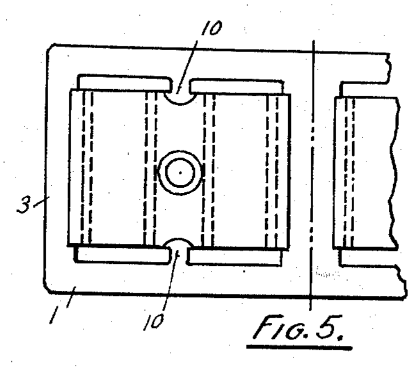
Figure 7:
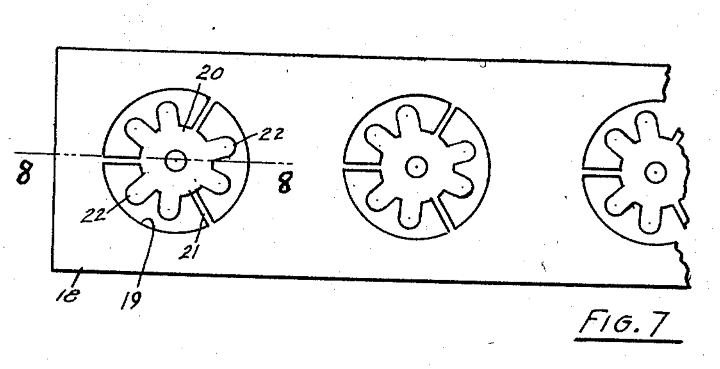
Figure 8:
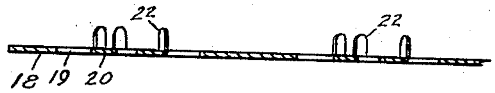
Figure 9:
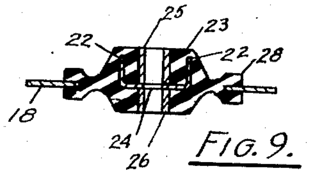
Figure 10:
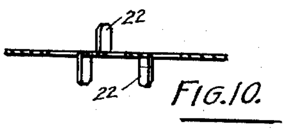
Figure 11:
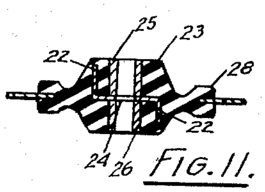
Figure 11A:
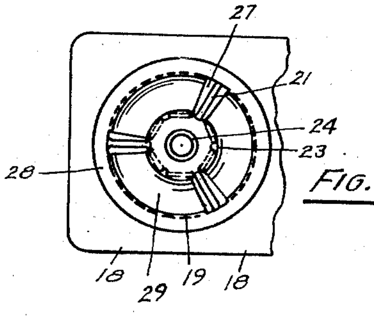
Figure 12:
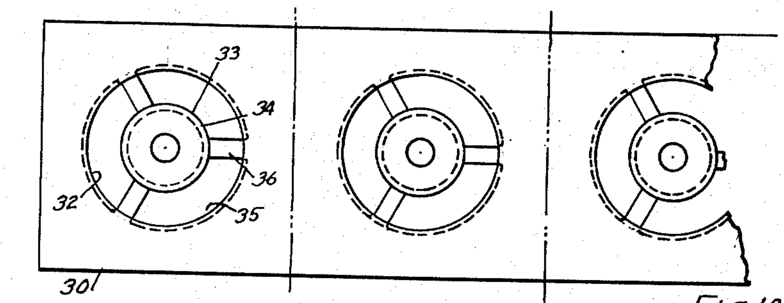
Figure 13:
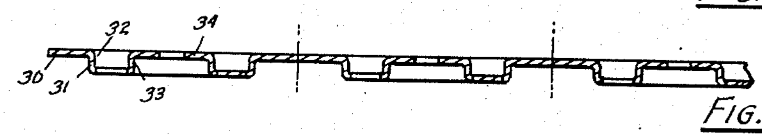
Figures 14, 15, 16, 17:
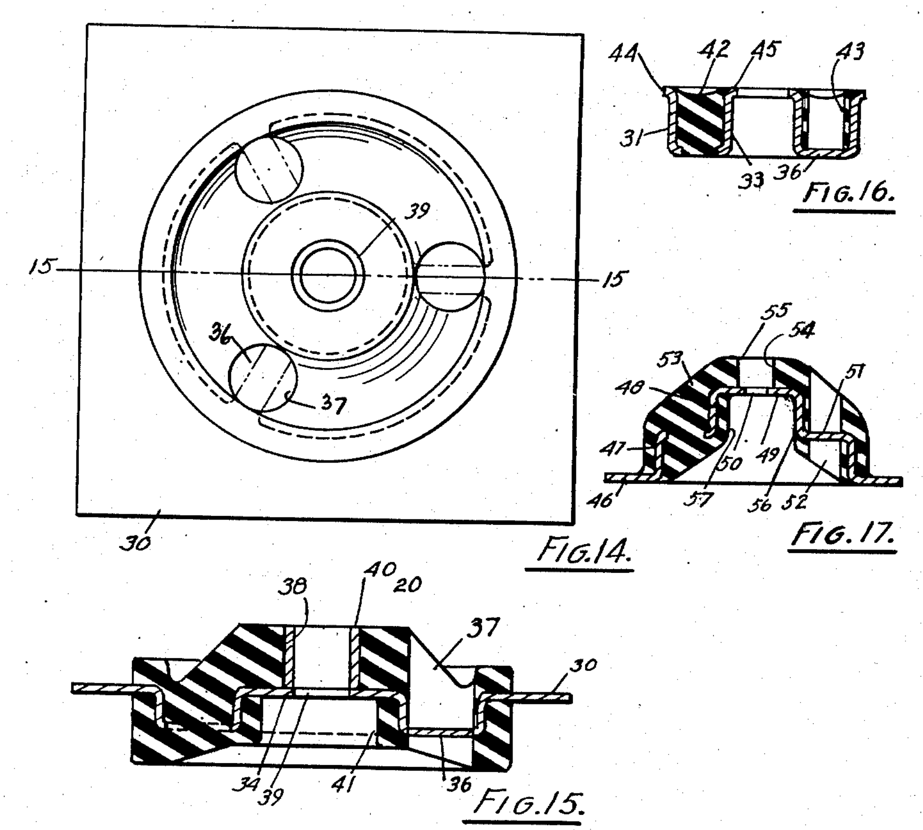
Figures 18, 20:
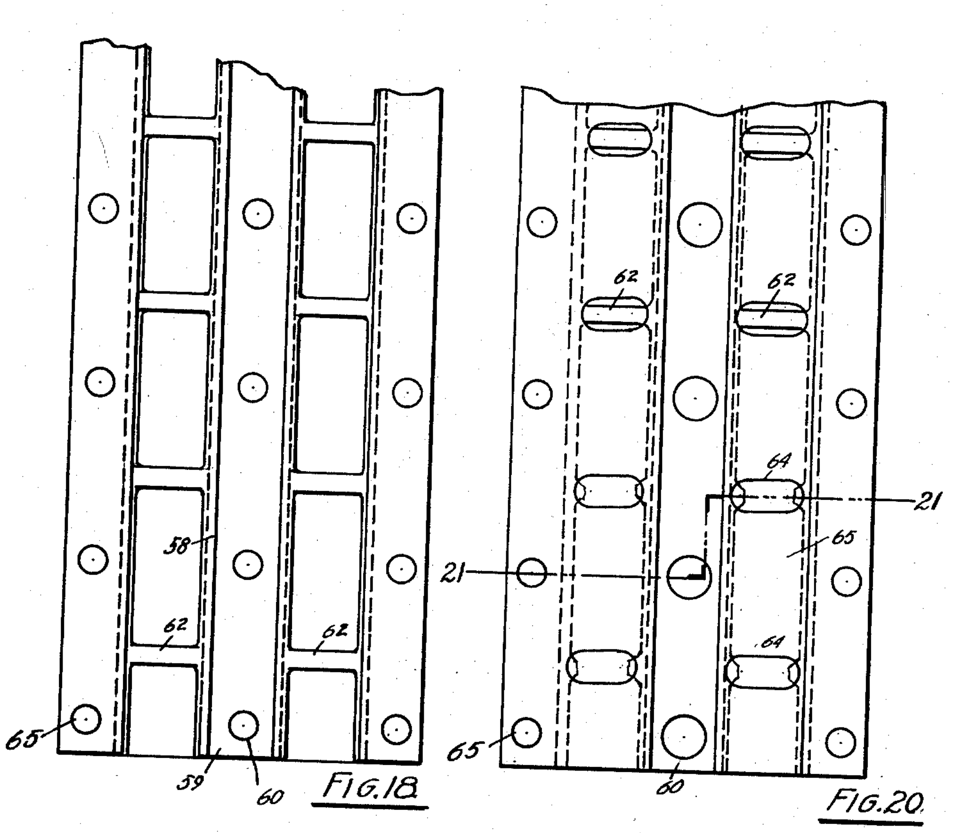
Figure 19:
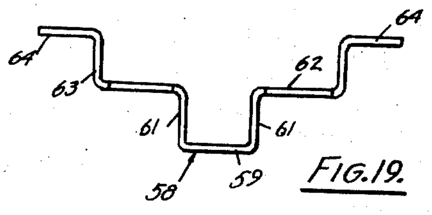
Figure 21:
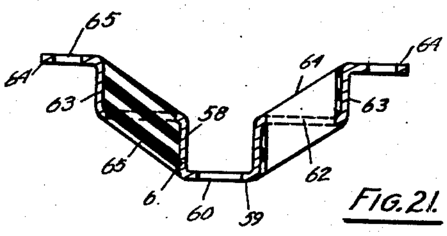
Figure 22:
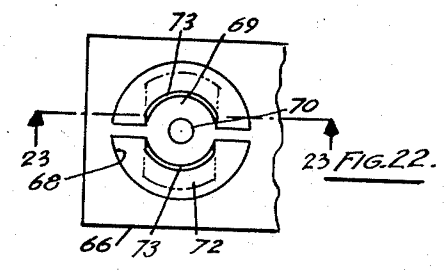
Figure 23:
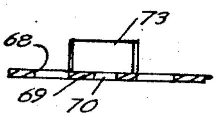
Figures 24, 25, 26, 27, 28, 29, 30, 31, 32:
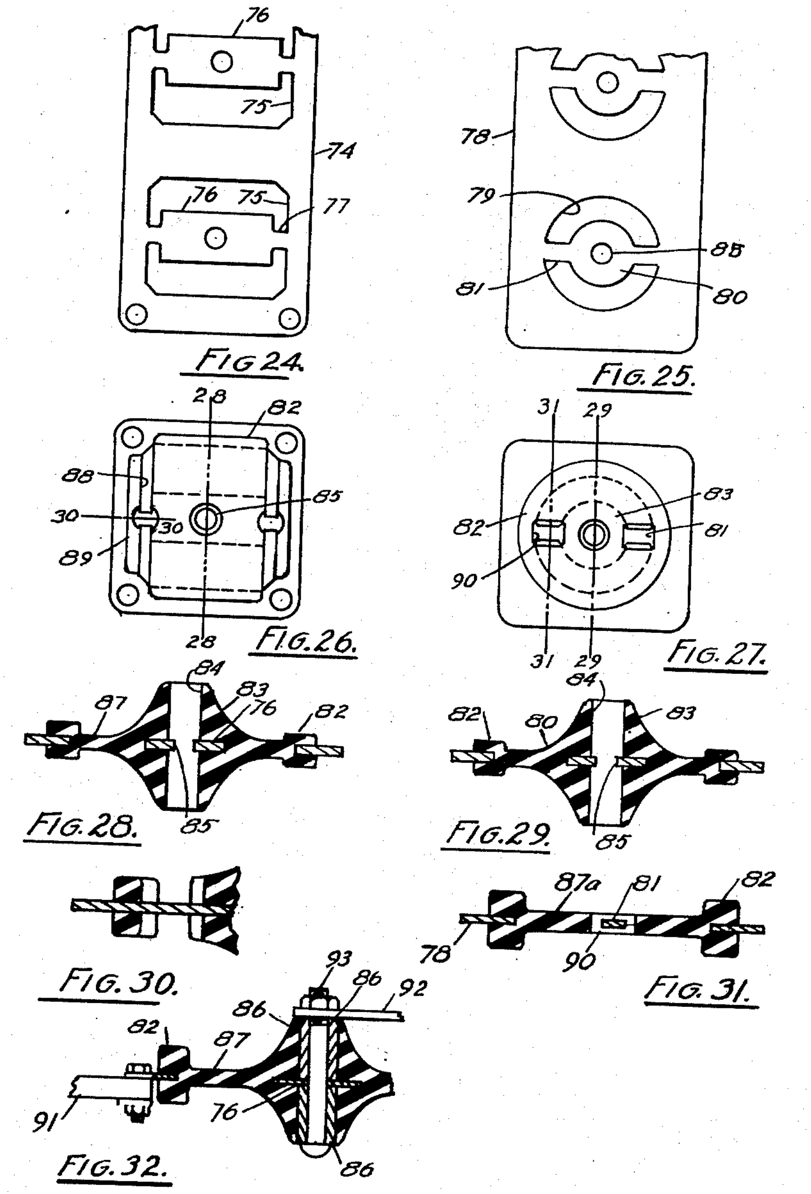

In the drawings, Fig. 1 is a plan view of a blank strip for use in the manufacture of rectangular plate form mountings; Fig. 2 is a plan view of the strip after forming of the flanges; Fig. 3 is an edge view partly in section; Fig. 4 is a sectional view through a molded mounting; Fig. 5 is a plan view of a strip of molded mountings; Fig. 6 is a plan view of the completed mounting with the knock-out sections removed; Fig. 7 is a plan view of a modified form of strip for making circular plate form mountings; Fig. 8 is an edge view of the strip in section along lines 8—8 of Fig. 7; Fig. 9 is a sectional view of a completed mounting; Fig. 10 is a view similar to Fig. 8 in which the tabs or petals are alternately bent up and down; Fig. 11 is a sectional view of a mounting made with the Fig. 10 strip; Fig. 11*a* is a plan view of the Fig. 11 mounting; Fig. 12 is a plan view of another form of strip for making mountings in which the supporting and supported members comprise concentric inner and outer tubes; Fig. 13 is a longitudinal section of the Fig. 12 strip; Fig. 14 is a top view of a mounting; Fig. 15 is a section on line 15—15 of Fig. 14; Fig. 16 is a section through another form of mounting which can be made with the Fig. 12 strip; Fig. 17 is a section through a mounting made from a strip similar to Fig. 12 except that the inner section extends beyond the outer section rather than turning back or re-entering the outer section; Fig. 18 is a plan view of another form of strip; Fig. 19 is an end view of the strip; Fig. 20 is a plan view of the molded strip in which the knockout sections are partly removed; Fig. 21 is a section on line 21—21 of Fig. 20; Fig. 22 is a plan view of another form of strip for use in the manufacture of circular plate form mountings; Fig. 23 is a section on line 23—23 of Fig. 22; Fig. 24 is a plan view of a strip of supporting and supported members; Fig. 25 is a plan view of another strip of supporting and supported members; Fig. 26 and Fig. 27 are top views of molded mountings using the strips of Figs. 24 and 25; Fig. 28 is a section on line 28—28 of Fig. 26; Fig. 29 is a section on line 29—29 of Fig. 27; Fig. 30 is a section on line 30—30 of Fig. 26; Fig. 31 is a section on line 31—31 of Fig. 29 and Fig. 32 is an enlarged view through the hub of a finished mounting showing the connection to a vibrating body.

Referring to Fig. 1 of the drawings, there is shown a sheet metal strip 1 having a series of inner and outer members 2 and 3. The inner members 2 are connected to the outer members by knock-out sections 4 at each end thereof. After the blanking operation flanges 5 at each side of the inner members 2 are bent upward and flanges 6 on the outer members are bent downward. After the bending operation, as clearly shown in Fig. 3, both the inner and outer members 2 and 3 are substantially stiffened by the flanges 5 and 6. The flanges 5 and 6 also provide an extended bonding surface which increases the ultimate strength of the molded mounting.

In the molding of the mounting, one or more of the sheet metal strips are loaded between mating mold parts having mold cavities defining the desired rubber shape for the rubber part connecting the inner and outer members 2 and 3. The knock-out sections 4 hold the parts 2 and 3 in fixed relation during the loading of the mold. As the mold is closed the parts 2 and 3 are securely clamped therebetween and any slight twisting of the parts 2 is eliminated by the mold clamping forces. The mold parts have pins of slightly greater diameter than the openings 7 in the members 2 which close against opposite sides of the members 2 and provide cavities in the rubber sections aligned with the bolt holes 7 for receiving tubular ferrules 8 and 9. The mold parts also have pins or projections which close on opposite sides of the knock-out pieces 4 and provide notches or passageways 10 through which the knock-out pieces may be punched out after the molding operation.

Although the Fig. 1 metal strip may be used in the manufacture of a number of different types of mountings, the strip is illustrated in connection with a snubbing type mounting having a rubber section 11 with inclined upper and lower faces 12 and 13. The faces 12 and 13 are not quite parallel, being slightly further spaced apart at the center around the bolt hole 7 than at the outside. In the use of the mounting, metal snubbing washers 14 and 15 are arranged at the top and bottom of the rubber section 11 and through bolt 16 is tightened to pull the washers solidly together against the ends of the ferrules 8 and 9. Under this condition the ferrules 8 and 9 are clamped solidly against the inner member 2 and form an effectively rigid metallic connection between the washers 14 and 15. From one aspect the tightening of the through bolt 16 preloads the rubber to a force nearly equal to the weight to be carried by the mounting. Under normal vibration conditions, there is a limited free space between the surfaces 12 and 13 and the washers 14 and 15 which accommodates the vibration by shear between the inner and outer members 2 and 3. Under large amplitude vibrations such as those incident to shock, the rubber progressively bottoms against the washers 14 and 15 and thereby snubs or limits the amplitude of vibration.

The manufacture of the mountings is greatly simplified particularly in the elimination of handling of small parts. After forming the sheet metal strip to the shape shown in Fig. 2, the entire strip can be processed for bonding and then loaded as a unit into the mold. Upon removal from the mold the strip is severed into completed mountings by a simple blanking operation which simultaneously punches out the knockout sections 4 and blanks the periphery of the outer member 3 to the desired shape with suitable attaching holes 17. Upon inserting the tubular ferrules 8 and 9 into the cylindrical cavity on opposite sides of the bolt holes 7 the mounting is complete and ready for installation as described above.

It should be noted that the blanking operation is simplified by the fact that the knock-out sections 4 are located in the plane of the sheet metal strip 1. The flanges 5 and 6 which increase the strength of the mounting extend substantially at right angles or transverse to the knock-out sections 4. These flanges in no way interfere with the blanking operation. While for multicavity molds it will ordinarily be more convenient to use sheet metal strips formed to produce a plurality of mountings which can be blanked from the strip, there would be substantial advantages in having a single piece for use in a single cavity mold to form a single mounting which merely required blanking of the knock-out sections 4 at the end of the molding operation.

In Figs. 7 to 11, inclusive, is shown a strip for the manufacture of mountings disclosed in Patent 1,996,210. As shown in Fig. 7, a strip 18 of sheet metal has blanked therein openings 19 at the center of which is a washer 20 connected to the edges of the opening by three equally spaced knock-out sections 21. Between the knock-out sections 21 the washer 20 has radially projecting fingers 22 which, as shown in Figs. 8 and 10, are either formed upward (Fig. 8) or alternately upward and downward (Fig. 10). After the forming operation the washer 20, in effect, has metallic fingers or petals 22 surrounding the periphery of the washer which provide extended bonding surfaces for the rubber. As shown in Figs. 9 and 11, the fingers or petals 22 effectively anchor the rubber hub 23 at the center of the mounting so that it, in effect, simulates in performance a solid metal or rigid cylinder having the outside diameter corresponding to the outer surfaces of the fingers 22. Because of the spaces between the fingers 22 the hub 23 does not exactly correspond to the performance of a mounting in which the washer 20 and fingers 22 are replaced by a metallic or rigid surface bonded in the center of the hub. However, for all practical purposes the performance is quite close.

The manufacture or molding of the mountings is similar to the previously described constructions. After the blanking and forming operations, the strips in the condition illustrated either in Fig. 8 or in Fig. 10, are first processed for bonding to rubber and then loaded into the mold. The mold has pins or projections engaging the opposite sides of the washer 20 and of slightly larger diameter than the attaching opening 24 so that the cavities formed in the hub 23 around the opening 24 receive cylindrical metal ferrules 25 and 26. The mold also has mating pins or projections which form notches 27 providing clearance openings or passageways through which the knock-out sections 21 may be punched out. As shown more clearly in Fig. 11*a*, the completed mounting as it comes from the mold comprises the rubber hub 23 embedding the washer 20 and the fingers or petals 22, a rubber rim 28 embedding the edges of the opening 19, and a rubber flexing section 29 connecting the rim and hub and providing the vibration isolating connection. As the mounting comes from the mold, the flexing section 29 is bridged by the knock-out sections 21 so that there can be no relative movement between the hub 23 and the rim 28 until after the knock-out sections have been punched out. After punching of the knock-out sections, which can conveniently be done at the same time that the mountings are blanked or severed from the strip 18, the mounting will function in essentially the same manner as the mounting disclosed in Patent 1,996,210. In use, a through bolt extends through the opening 24 and clamps the cylindrical ferrules 25 and 26 against the washer 20 so that the ferrules and washer form an essentially rigid structure.

In Figs. 12 to 16, inclusive is shown a mounting of the type having concentric cylindrical inner and outer members connected by a rubber flexing section. This mounting utilizes a sheet metal strip 30 having a cylindrical section 31 defining an opening 32 and a spaced cylindrical section 33 depending from the edges of a washer 34 at the center of the opening 32. Preferably the cylindrical sections 31 and 32 are formed in a drawing or stamping operation which leaves the washer 34 in the plane of the strip and the lower ends of the cylindrical sections 31 and 32 connected by a bottom well which is subsequently punched out to provide openings 35 and bridging or knock-out members 36 connecting the lower ends of the cylindrical sections 31 and 33.

After processing for bonding, the strip is loaded into a mold having pins gripping or clamping opposite sides of the knock-out sections 36 and providing in the completed mounting openings or passageways 37 through which the knock-out sections 36 may be punched out.

The shape of the rubber is subject to wide variation. As shown in Fig. 15, the rubber may embed the upper and lower surfaces of the plate 30, the washer 34, and the inner and outer surfaces of the cylindrical sections 31 and 33. In this particular shape, it is desirable that an enlarged opening 38 be molded around the bolt opening 39 in the washer 34 to receive a ferrule 40. It is also desirable that the under side of the washer 34 have an enlarged clearance opening 41 for the bolt head.

Fig. 16 is a section through another form of mounting which can be made with the Figs. 12, 13 strip. In the Fig. 16 mounting the rubber section 42 is confined between the opposed surfaces of the cylindrical projections 31 and 33. During molding there are, of course formed cored openings 43 corresponding to the openings 37 through which the knock-out sections 36 may be punched out. The removal of the knock-out sections 36 may be simultaneous with the blanking of the mountings from the strip 30. In this type of mounting it is usually not necessary to have an attaching plate. Accordingly the mounting is shown with the metal blanked close to the outer surface of the cylindrical projection 31 and the inner surface of the cylindrical projection 33. There may be slight flanges 44 and 45 left to make the blanking operation easier. These flanges do not change the essential characteristics of the mounting which is generally known in the art as "tube form."

In Fig. 17 is shown a section through another modification which can be made from a strip similar to that shown in Figs. 12 and 13. In this mounting there is a sheet metal strip 46 having a cylindrical flange 47 extending therefrom which serves as the outer member of the mounting. At the upper edge of the cylinder 47 is a bottom wall in the center of which is formed an upwardly extending cylindrical projection 48 which serves as the inner member of the mounting. While in the Figs. 12, 13 strip the inner and outer cylindrical sections were concentric and in opposed relation to each other, in the Fig. 17 strip the inner and outer cylindrical sections are in stepped relation, being spaced not only radially but axially. The cylindrical section 48 which serves as the inner member of the mounting may have a bottom wall 49 provided with a bolt hole 50. After the forming of the sections 47 and 48 on the strip 46, the bottom wall connecting the upper end of the cylindrical section 47 and the lower end of the cylindrical section 48 is preferably blanked out to provide knock-out sections 51 which, during the molding operation, serve to locate the sections 47 and 48.

During molding a cored opening or passageway 52 is formed in the rubber section 53 connecting the inner and outer parts of the mounting through which the knock-out sections may be punched out when the mountings are blanked from the strips 46. There is also formed around the bolt opening 50 a cored opening 54 for receiving a tubular sleeve 55. On the under side of the cylindrical member 48 there is formed a clearance opening 56 for the bolt head. As shown at the right hand side of Fig. 17, the clearance opening 56 may comprise the complete inner diameter of the cylindrical projection 48. Or as shown at the left hand side in Fig. 17, the clearance opening 56 may be defined by an inner coating of rubber 57.

In Figs. 18 through 21, inclusive, there is shown a strip type mounting having a channel shaped inner member 58 having a bottom wall 59 provided with attaching holes 60 and having flanges 61 joined at their ends by knock-out strips 62 to flanges 63 having angularly extending attaching surfaces 64 provided with attaching holes 65. The strip may be rolled in a single piece and the knock-out sections 62 formed by blanking suitable openings in the web connecting the flanges 61 and 63. As shown in Figs. 20 and 21, after molding there is a continuous strip having a plurality of openings or passageways 64 extending through the rubber section 65 so that the knock-out sections 62 may be punched out. After removal of the knock-out sections 62, the rubber section 65 transfers the load from the flanges 63 to the flanges 61 in shear. The molded strip shown in Fig. 20 functions as a mounting after the knock-out sections 62 are removed. It is possible to cut the strip into different lengths in order to obtain mountings of different load carrying capacity. Conveniently the mountings may be cut at the locations of the knock-out strips, since at this point the rubber is interrupted by the openings 64 and it is only necessary to sever the metal in order to divide the strip into the desired size mounting. There are sufficient openings 64 so that it will ordinarily be unnecessary to cut through the rubber section 65 intermediate the knock-out sections 62.

In Figs. 22 and 23 is shown another modification for producing mountings similar to those produced by the strip shown in Figs. 7 and 8. As shown in Fig. 22 there is a strip 66 of sheet metal having a series of circular openings 68 blanked therein. At the center of the openings is a washer 69 provided at its center with a bolt opening 70 and located within the opening 68 by knock-out sections 71 extending from the edges of the washer 69. On each side of the knock-out sections 71 are arcuate tabs 72 which, after blanking, are adapted to be formed up into semi-cylindrical sections 73. These semi-cylindrical sections may be made to extend either up or down from the strip 66 and serve essentially the same function as the tabs or pets 22 in the Fig. 9 construction. That is, the semi-cylindrical sections 63, in effect, anchor the hub of the finished mounting so that essentially the same effect is produced as though the hub of the finished mounting were replaced by a rigid cylinder bonded into the hub. Mountings using the strip shown in Figs. 22 and 23 are molded in the same procedure as the mountings using the strip shown in Figs. 7 and 8 except that only two clearance holes are provided for removal of the knock-out sections.

In Fig. 24, 74 indicates a strip of sheet metal which has openings 75 at the center of each of which is an elongated hub 76 connected to the edges of the openings by narrow knock-out sections 77. There are a plurality of openings 75 in the strip so that after molding the strip may be cut between each opening to form individual mountings.

In Fig. 25 is shown a strip 78 having circular openings 79 uniformly spaced along its length. At the center of the openings are circular hubs 80 connected at diametral points to the edges of the openings by knock-out sections 81.

During molding the strips 74 or 78 are laid between the mating halves of a mold and rubber or like material is bonded to the strips. As shown in Figs. 26–31 the rubber has a relatively thick rim 82 embedding the edges of the openings 75 and 78. The thickness of the rim is preferably sufficient to form an effectively rigid rubber wall adjacent the edges of the openings. Another function of the rim is as a cushioned stop limiting the movement of the mounting. On each side of the hub sections 76 and 80 the rubber is extended to form a rubber hub 83 having openings 84 slightly larger than the openings 85 in the hub sections 76 and 80. After molding, metal sleeves 86 are inserted in the openings 84 and are clamped against the upper and lower surfaces of the hub sections 76 and 80. This results in tubular metal mounting extensions effectively rigid with the hub sections 76 and 80. The metal sleeves are not bonded to the rubber hubs but because of the elongation of the rubber hub sections there is substantially no relative movement between the rubber and the sleeves which would cause chafing. The shrinkage of the rubber is in the direction to compress the bond between the rubber and the hub sections 76, 80. From one aspect the hub sections 76, 80 have edges received in recesses in the rubber hub 83 with axially presented surfaces gripped both by the inherent tension of the rubber and by the bond between the surfaces and the rubber. Both of these gripping forces resist removal of the sleeves 86. Between the rim and hub sections 9 and 10 are connecting webs 87 and 87*a*. In the Fig. 26 mounting where the rim and hub sections are rectangular the webs 87 extend from the long sides of the hub sections 83 toward the rim sections 82. In the Fig. 27 mounting where the hub and rim sections are circular the web 87*a* extends radially between the hub and rim sections. In both forms of mountings the webs are thinner than the hub and rim sections and form a retlative soft cushion section deflecting under vibration. In both forms of mountings there is little movement of the web sections adjacent the relatively thick hub and rim sections. Substantially all of the deflection takes place in the web sections. The hub and rim sections from one aspect provide an effectively rigid anchor for the ends of the web sections so that the web sections will have a uniform response.

In the Fig. 26 mounting at the ends of the hub sections 76 are openings 88 extending transverse to the knock-out sections 4. Directly above the knock-out sections are enlargements 89 through which a punch may be inserted to sever the knock-out sections. While the openings 88 to some extent interrupt the rubber connection between the rim and hub, there remains a sufficient rubber section for adequate vibration isolation.

In the mounting shown in Fig. 27 there are openings or passageways 90 through the web section 87*a* registering with the knock-out sections 81. These openings are sufficiently larger than the knock-out sections so that the knock-out sections may be punched out without interfering with the bond between the rubber and any of the metal plates. In the Fig. 26 mounting only a small part of the rubber web 87 is pierced by the openings 17.

A typical installation of the mountings is shown in Fig. 32. The portion of the metal plate extending beyond the rim 82 is attached to a base 91. The member 92 to be supported on the base is fastened to the hub on the mounting by a through bolt 93 which extends through the metal sleeves 86 and clamps the ends of the sleeves against the hub sections (76 or 80). The body is now supported in vibration isolating relation to the base by the web section 87 (or 87*a*). Because of the greater thickness of the rubber adjacent the rim 82 and the rubber hub 83 the stiffness of the web section 87 (or 87*a*) under vibratory forces is effectively the same as though the ends of the web section were rigidly anchored at surfaces constituting effective continuations of the edge surfaces of the openings 75 (or 79) and of the metal hub sections 76 (or 80).

This mounting construction reduces the cost of manufacture by reducing the number of metal parts which must be handled both during the processing of the metal parts for bonding and in the loading of the rubber molds.

What I claim as new is:

1. In a mounting, spaced supporting and supported members having bonded thereto by molding an intermediate member of rubber or like resilient material serving as a vibration isolating connection, a passageway molded through the resilient material, and a bridging member rigidly connected between and holding the supporting and supported members in fixed relation and extending across the passageway so that after molding the bridging member may be removed or interrupted through the passageway, said supporting and supported members prior to removal of the bridging member constituting a single unit.

2. In a mounting, a plate having an opening therein with a bridging member extending across the opening, a disk at the intermediate part of the bridging member, the disk, plate and bridging member constituting a single unit, a member of rubber or like resilient material having a hub bonded to said disk, a rim embedding and bonded to the edges of the plate around the opening, and a web connecting the hub and rim, and a passageway molded through the web providing access for removal or interruption of the bridging member after molding.

3. In a mounting, spaced supporting and supported members having bonded thereto by molding an intermediate member of rubber or like resilient material serving as a vibration isolating connection, one of the members comprising a plate with an opening therein and the other of the members being within the opening, a passageway molded through the resilient material and a bridging member rigidly connected between and holding the supporting and supported members in fixed relation and extending across the passageway whereby it may be removed or interrupted through the passageway, said supporting and supported members prior to removal of the bridging member constituting a single unit.

4. A mounting or joint comprising spaced supporting and supported members, one of which lies within the projected area of a perforation in the other, a strut rigidly connecting the members, resilient material such as rubber bonded to the members and serving as a vibration isolating connection therebetween, and a passageway in the resilient material providing access to the strut to remove or interrupt the same, said supporting and supported members prior to removal of the strut constituting a single unit.

5. In a mounting, spaced supporting and supported members having bonded thereto by molding an intermediate member of rubber or like resilient material serving as a vibration isolating connection, and a removable bridging member located within the rubber member rigidly connected between and holding the supporting and supported members in fixed relation, said supporting and supported members prior to removal of the bridging member constituting a single unit.

6. In a mounting, spaced supporting and supported members having bonded thereto by molding an intermediate member of rubber or like resilient material serving as a vibration isolating connection, one of the members comprising a plate with an opening therein and the other of the members being within the projected area of the opening, and a bridging member located within the rubber member rigidly connected between and holding the supporting and supported members in fixed relation whereby the supporting and supported members may be handled as a unit prior to molding.

7. The construction of claim 2 in which the disk has a flange on its outer part extending in a direction transverse to the disk and the resilient material is bonded to and imbeds the disk and flange.

8. The construction of claim 7 in which the flange on the disk is in the form of fingers.

9. The construction of claim 1 in which the supporting and supported members comprise inner and outer cylindrical members radially spaced apart and the bridging member extends between adjacent edges of the members.

10. The construction of claim 1 in which the supporting and supported members have spaced surfaces, to which the resilient material is bonded, offset to bring the surfaces out of opposed relation.

11. The construction of claim 1 in which the supporting and supported members have spaced surfaces offset in opposite directions transverse to the bridging member and the resilient material is bonded to the surfaces.

12. The construction of claim 6 in which the one of the supporting and supported members is rectangular and lies within the projected area of a rectangular perforation in the other.

13. The construction of claim 4 in which the one of the supporting and supported members is rectanguar and lies within the projected area of a rectangular perforation in the other, and said members have opposed flanges extending transverse to the respective members and providing extended surfaces to which the resilient material is bonded.

14. The construction of claim 1 in which the supporting and supported members comprise longitudinally extending inner and outer members, the inner member lying between and laterally spaced from the outer member.

References Cited in the file of this patent

UNITED STATES PATENTS

| Number | Name | Date |
|---|---|---|
| 1,161,194 | Cook | Nov. 23, 1915 |
| 1,996,210 | Lord et al. | Apr. 2, 1935 |
| 2,014,467 | Cheyney | Sept. 17, 1935 |
| 2,138,175 | Keys | Nov. 29, 1938 |
| 2,173,186 | Swartz et al. | Sept. 19, 1939 |
| 2,357,740 | Hickin | Sept. 5, 1944 |
| 2,459,741 | Kubaugh | Jan. 18, 1949 |
| 2,461,969 | Dodge | Feb. 15, 1949 |
| 2,502,313 | Dodge | Mar. 28, 1950 |
| 2,531,059 | Krotz | Nov. 21, 1950 |
| 2,541,430 | Molton | Feb. 13, 1951 |